United States Patent [19]
Watkins

[11] Patent Number: 5,821,944
[45] Date of Patent: *Oct. 13, 1998

[54] COMPUTER GRAPHICS PIXEL RENDERING SYSTEM WITH MULTI-LEVEL SCANNING

[75] Inventor: Gary S. Watkins, Salt Lake City, Utah

[73] Assignee: Evans & Sutherland Computer Corp., Salt Lake City, Utah

[*] Notice: The term of this patent shall not extend beyond the expiration date of Pat. No. 5,598,517.

[21] Appl. No.: 788,738

[22] Filed: Jan. 24, 1997

Related U.S. Application Data

[63] Continuation-in-part of Ser. No. 370,669, Jan. 10, 1995, Pat. No. 5,598,517.
[51] Int. Cl.$^6$ .................................................. G06T 15/00
[52] U.S. Cl. ............................................................ 345/430
[58] Field of Search .................................... 395/118, 119, 395/123, 125–130, 131, 132, 133, 141, 143, 515, 523–525; 345/418, 419, 423, 425–433, 441, 443, 515, 523–525

[56] References Cited

U.S. PATENT DOCUMENTS 5,598,517  1/1997  Watkins .................................. 395/141

Primary Examiner—Almis R. Jankus
Attorney, Agent, or Firm—Thorpe, North & Western, LLP

[57] ABSTRACT

A geometric processor provides object primitives, as triangles, in graphic display image space to support a dynamic display. The image space is defined by pixels, in turn specified in arrays as spans. In a multi-level scanning operation, primitives are scanned at a first level to locate lapped spans that are lapped by primitives. At a second level, spans are scanned to process pixels that are lapped by primitives. An alternative embodiment discloses three-level scanning in association with parallel pixel processing. Concurrent texturing structure operates along with cache memories.

20 Claims, 12 Drawing Sheets

COMPUTER GRAPHICS PIXEL RENDERING SYSTEM WITH MULTI-LEVEL SCANNING

CROSS REFERENCE TO RELATED APPLICATIONS

This is a continuation-in-part of Application Ser. No. 08/370,669 filed Jan. 10, 1995 now U.S. Pat. No. 5,598,517, and entitled "COMPUTER GRAPHICS PIXEL RENDERING SYSTEM WITH MULTI-LEVEL SCANNING" (as amended).

BACKGROUND AND SUMMARY OF THE INVENTION

Traditionally, computer graphics systems have involved the display of data on the screen of a cathode ray tube (CRT) to accomplish dynamic images. Typically, the displays are composed by a rectangular array including thousands of individual picture elements (pixels or pels). Each pixel is represented by specific stored pixel data, for example data representing color, intensity and depth.

Pixel data may be supplied to the CRT from a so called "frame buffer" capable of providing and delivering the data at a high rate. Various formats for organizing frame buffers to drive displays are disclosed in a textbook entitled "Computer Graphics: Principles and Practice", Second Edition, Foley, Van Dam, Feiner and Hughes, published 1987, by Addison-Wesley Publishing Company (incorporated herein by reference).

To sequentially "display" or "write", pixels by exciting the CRT display screen, raster-scan patterns are widely used, both in television and in the field of computer graphics. Raster scan operation can be analogized to the pattern of western reading, i.e. pixels, like words are scanned one by one, from left to right, row by row, moving downward. Thus, the exciting beam in a CRT traces a raster pattern to accomplish a dynamic display pixel-by-pixel, line-by-line, frame-by-frame. The system for such a display typically includes a central processor unit, a system bus, a main memory, a frame buffer, a video controller and a CRT display unit. Such systems are described in detail in the above-referenced Foley textbook.

Generally, to support a dynamic graphics display, three-dimensional geometric data, representative of objects or primitives (e.g. polygons, as triangles), is stored in the main memory. The geometric data is processed to provide selected data that is scan converted to generate display data defining each individual pixel. The resulting data is stored in the frame buffer and supplied to drive the CRT display in raster sequence. Typically, for dynamic displays, the frame buffer is cyclically refreshed or loaded during first intervals preparatory to driving the display during alternating second intervals.

For a raster scan display, convention has involved organizing the processing sequence to load the frame buffer in a sequence relationship similar to the raster pattern. That is, the raster scanline organization of frame buffers for delivering video data to the CRT, usually has been duplicated for writing pixel data into the frame buffer. Usually, data is scan converted to develop and store pixels in fragments of the raster sequence. To some extent, particularly in view of certain storage devices, the technique sometimes improved access to data for processing.

At this point, a few comments are deemed appropriate on the scan conversion of data to provide individual pixels. Essentially, graphics images are formed from primitive shapes (typically triangles) defining objects that appear in the display. To generate the pixels, the selected primitives are dissected by scan conversion to determine contributions to each pixel in the display. As the primitives are processed, the dominance of objects is resolved. For example, a dominant object may hide surfaces of another object. Accordingly, primitives are considered individually in relation to the cumulative determinations of each pixel (stored in the frame buffer) until all objects are considered. Concurrent with the processing of primitives, textures also can be reflected in the pixels from a texture memory.

Generally, the performance of a video graphics system is controlled by several factors as discussed in the above-identified Foley textbook, specifically in a section beginning on page 882. Three significant factors are: (1) the speed at which pixels can be generated by a processor or scanning engine, (2) the speed at which resultant pixels can be written into a frame buffer, and (3) when images are mapped with texture, the speed at which the texture elements (texels) can be read from a texture memory. A detailed treatment of the problems attendant memory operation for graphics systems is presented in an article entitled "Memory Design for Raster Graphics Displays" by Mary C. Whitton, published in IEEE CG&A, in 1984 designated 0272-1716/84/0300-0048 (incorporated herein by reference).

The speed of generating pixels in a scanning engine or processor has traditionally been faster than the ability of a system to either: read texels from a texture memory for texture mapping, or write resultant pixels into a frame buffer memory. To help alleviate this memory bandwidth problem, systems have been built with multiple banks of texture memory and/or frame buffer memory. The several banks can operate in parallel at slower memory speeds, so that any one bank of memory need not run at the speed of the pixel-scanning engine. However, as a group, the combined memory banks match the speed of the engine. In that regard, various parallel frame buffer organizations have been proposed, including the examples disclosed in the above-referenced Foley textbook at pages 887 and 890–893. Still, a need continues to exist for an improved system to scan primitives (dots, lines, polygons, or other surfaces) to generate pixels and store them in a frame buffer.

Generally, in accordance herewith, instead of scan processing a primitive in the traditional scanline order, distinct areas of the primitives are scanned in order. By scanning select primitive areas, the generated pixels can coincide to the needs of a particular frame buffer organization. Also by scanning select primitive areas in order, texture memory may be accessed in a relatively fast cache mode.

Essentially as disclosed herein, a multiple-level scanning approach is utilized to scan process primitives. For example, in relation to a display screen, defined span areas may constitute four-by-four pixel arrays and the pixels of a span (within a primitive or polygon) are generated in sequence. If a span is only partly covered by a polygon, only those pixels within the polygon (or contributing, as from a borderline location) are generated. After scanning the select pixels within a span, the system proceeds to scan another span. Spans may be of various configurations, e.g. square, rectangular, and they may include varying numbers of pixels.

Structurally, the system of the present invention may be embodied in accordance with various architectures for accomplishing computer displays. In that regard, a front end portion of the system may traverse data, transforming select primitives into screen space. Processing the primitives in screen space, a backend or scan processing portion then creates pixels for the final image. That is, by scan converting each primitive, the backend portion of the system identifies the contribution of primitives to each pixel and provides the appropriate shading. In the disclosed embodiment, a multi-level scan conversion sequence is used to generate pixels. Texture mapping is performed in the scan conversion and multiple rendering processors may be employed.

Recapitulating to some extent, the present invention may be implemented in a graphics system utilizing a geometric processor (front end) to provide primitives in screen space as in the form of polygons, e.g. triangles. A rendering or backend processor then scan converts the primitives utilizing a multi-level approach. In terms of two-dimensional screen space, span areas (spans) define arrays of pixels in relation to primitives. Portions of spans within primitives are scan converted, pixel-by-pixel in the processing of each span. After scan processing the appropriate pixels within each span, the system proceeds to scan another span.

Further in accordance herewith, a texture memory may be employed to store a texture map image for application to a polygon. Note that the texture memory is optional and is only required in systems performing texture mapping. In any event, as polygons are scan processed, the frame buffer receives and stores the resulting pixel data. In accordance herewith, for both a texture memory and the frame buffer, small, very fast cache memories may be utilized. In that regard, basic cache memories are well known and have been widely utilized.

In an alternative embodiment, a form of three-level scanning is disclosed. The lowest level involves scanning pixels within a span area (e.g. two-by-two or four-by-four pixels). The intermediate level of scanning is the spans within a panel area (e.g. 8×8 or 16×16 spans). Finally, all panels within a primitive area are scanned, that is, those panels containing pixels that may be affected by the primitive.

Generally, three-level scanning has been found particularly useful when higher level performance is desired by using multiple rendering processors operating in parallel. Such an embodiment also is disclosed. In that regard, each processor is assigned specific panels to scan. Within a panel, the processor generates pixels for all span areas within the panel and the primitive. After completing a panel, a processor begins generating pixels for some other panel. For example, eight rendering processors might be employed to simultaneously compute pixels for eight different panels.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, image displays, data formats, component structures, detailed memory organization and other elements in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiments for purposes of disclosure and to provide a basis for the claims herein which define the scope of the present invention.

Figure 1:
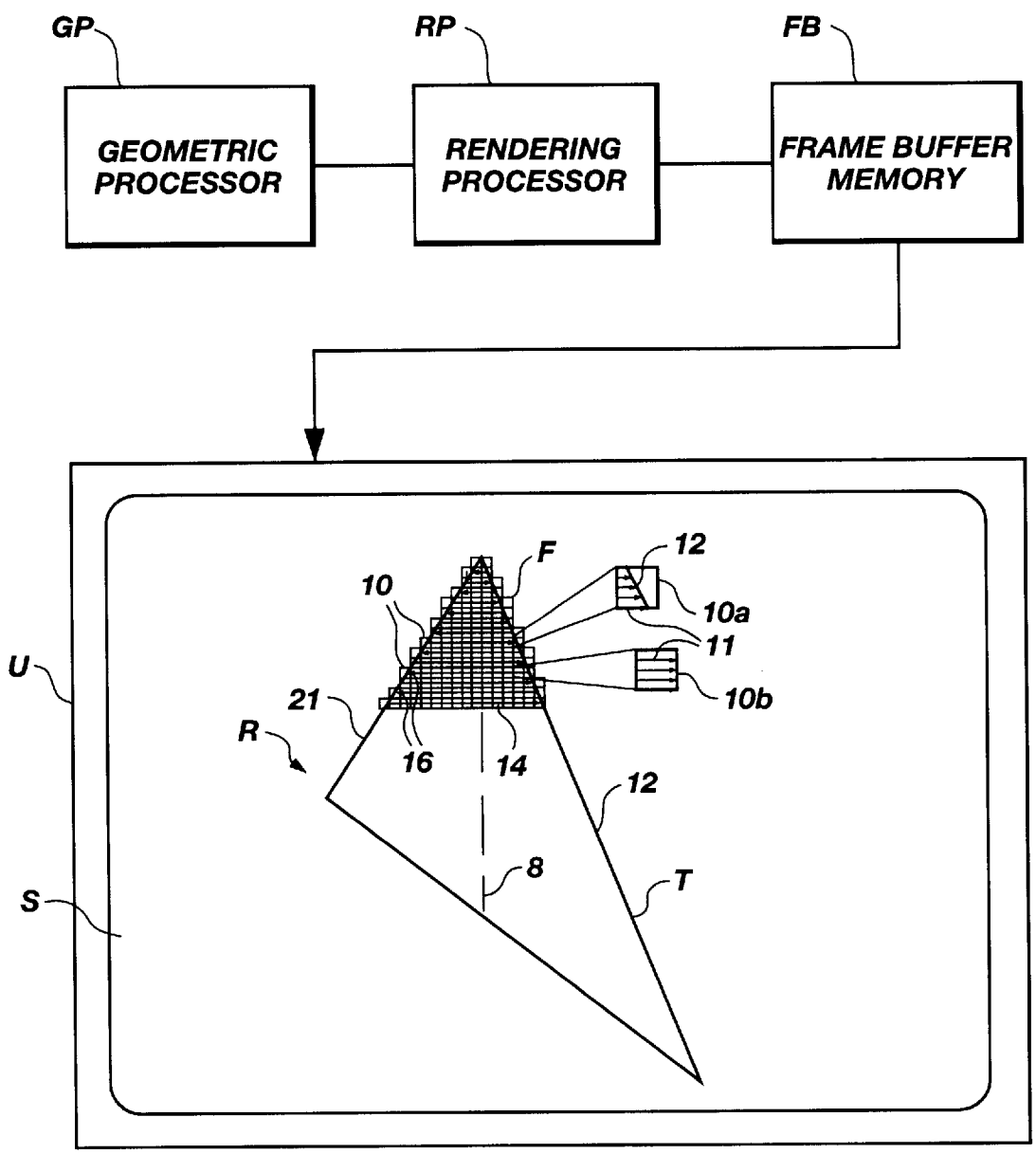
FIG. 1 is a block and teaching diagram of a system constructed in accordance with the present invention.

Referring initially to FIG. 1, a somewhat enlarged representation R is depicted to illustrate the operation of a disclosed embodiment (multi-level scanning system) in relation to the space of a CRT screen S of a display unit U. In that regard, the representation R does not actually appear on the screen S, but rather, it illustrates a grossly enlarged triangle T (primitive) to be scan processed in screen space.

An upper fragment F of the triangle T is overlayed to illustrate two-level scanning (span and pixel). It is to be understood that the scan processing illustrated by the fragment F would traverse the entire triangle T as indicated by a dashed line 8. However, for purposes of simplification and explanation, the illustrated scanning is limited to cover only the fragment F.

System components, memory organization, multi-level operation and scan processing in accordance with the representation R will be treated in detail below. However, preliminarily, consider the structure of the graphics system for driving the screen S of the display unit U.

A geometric processor GP (FIG. 1, upper left) is coupled to a rendering processor RP which, in turn is coupled to a frame buffer memory FB for driving the display unit U. The geometric processor GP functions as a front end, transforming primitives, e.g. triangles into screen space to represent selected geometric data for a display. Variations of such processors are well known as treated in Chapter 18 of the above-referenced Foley textbook.

The rendering processor RP, sometimes referred to as the back-end or rasterization processor, creates final images in the frame buffer FB by scan converting each of the primitives (e.g. the triangle T) representing geometric data. The operation may involve determining which primitives are visible at each pixel, then shading and texturing the pixel accordingly. Again, variations of such structures are well known in the prior art as disclosed in the above-referenced Foley textbook.

The distinct structures of the disclosed embodiment are provided in the rendering processor RP and the frame buffer FB to execute the process hereof. To explain the process, reference now will be made to the representation R depicted, not as a displayed image, but to illustrate an associative screen space relationship between the organization of the rendering processor RP and the frame buffer FB. Preliminarily, a few comments regarding the scan processing operation are deemed appropriate.

As indicated above, individual pixels are generated by testing numerous triangles that may appear in a display, for pixel contribution. A cumulative representation for each pixel is developed in the frame buffer FB until all the triangles have been treated. Generally, the disclosed embodiment involves processes for dissecting the triangles (polygons) on a pixel-by-pixel basis to render their contributions in the frame buffer FB. Detailed rendering operations are well known, as performed by pixel processors to revise cumulative stored pixels representing depth, color and texture as derived from previously processed triangles. Accordingly, rendering is not treated in detail herein, however, see the Foley textbook, section 18.7 at page 882. Also note that as disclosed in the referenced textbook, the term "span" has been used variously in the past to designate groups of pixels, as a line sequence.

Recapitulating, the operation of the system of FIG. 1 involves scan converting each of a large number of primitives exemplified by the triangle T. Essentially, a determination is made as to which triangles, or parts of triangles, are visible for representation by each pixel. The pixels also may be shaded and textured. In the final analysis, the contribution of the triangle T to each pixel is ultimately determined, possibly along with contributions from other polygons selected for a display.

As indicated above, the representation R illustrates the screen space relationship of the screen S to the processing sequence. Incidentally, the frame buffer memory FB stores pixels in a screen-space relationship to the screen S for raster sequence delivery. Typically, the frame buffer FB will include a plurality of memory planes and in accordance with various arrangements, elements may be variously located. Still, in accessing the frame buffer FB the associative space relationship with the screen S exists as illustrated.

The rendering processor RP also defines the triangle T (grossly enlarged) in screen space, which is scan processed with numerous others to generate pixels defining the display matrix for driving the screen S.

In FIG. 1, individual pixels are grouped in arrays of sixteen in square spans 10. Again, note that the spans also may take the form of rectangles and may embody varying numbers of individual pixels. To enhance the illustration of FIG. 1, two spans 10a and 10b are expanded to an enlarged form. Note that the span 10a is bisected by an edge 12 of the triangle T while the span 10b lies within the triangle T. Arrows 11 indicate rows of four pixels. Individual pixels are not illustrated, however, see FIG. 1A showing the span 10a greatly enlarged.

The operation as depicted in FIG. 1 involves selectively scanning the spans 10 that are lapped by the triangle T in raster sequence as illustrated by a span scan line 14 with directional arrows 16. The line 14 is shown in greater detail as a line 19 in FIG. 1A. Thus, as the spans 10 are scanned, the multi-level operation involves pixel scanning within each span. The selected (lapped) pixels that are treated in processing a polygon depend to some extent on the specific process. In that regard, various techniques have been proposed for selecting pixels near the edge of a polygon for processing. For example, see U.S. Pat. No. 4,873,515 entitled Computer Graphics Pixel Processing System, granted Oct. 10, 1989 to Slickson and Rushforth. Consequently, as used herein, the terms: "lapped", "coincident" and "selected" when applied to pixels identify those pixels that are selected for processing in accordance with the operation of the pixel processor.

In accordance with multi-level scanning operation, as each span 10 is treated in sequence (FIG. 1, scanline 14) the pixels 17 within it are scanned and processed. The scan processing of individual pixels 17 in the spans 10 is represented for the span 10a in FIG. 1A by a scanline 19. Dashed portions 19a are retrace or return strokes while solid portions 19b are processing strokes.

Figure 1A:
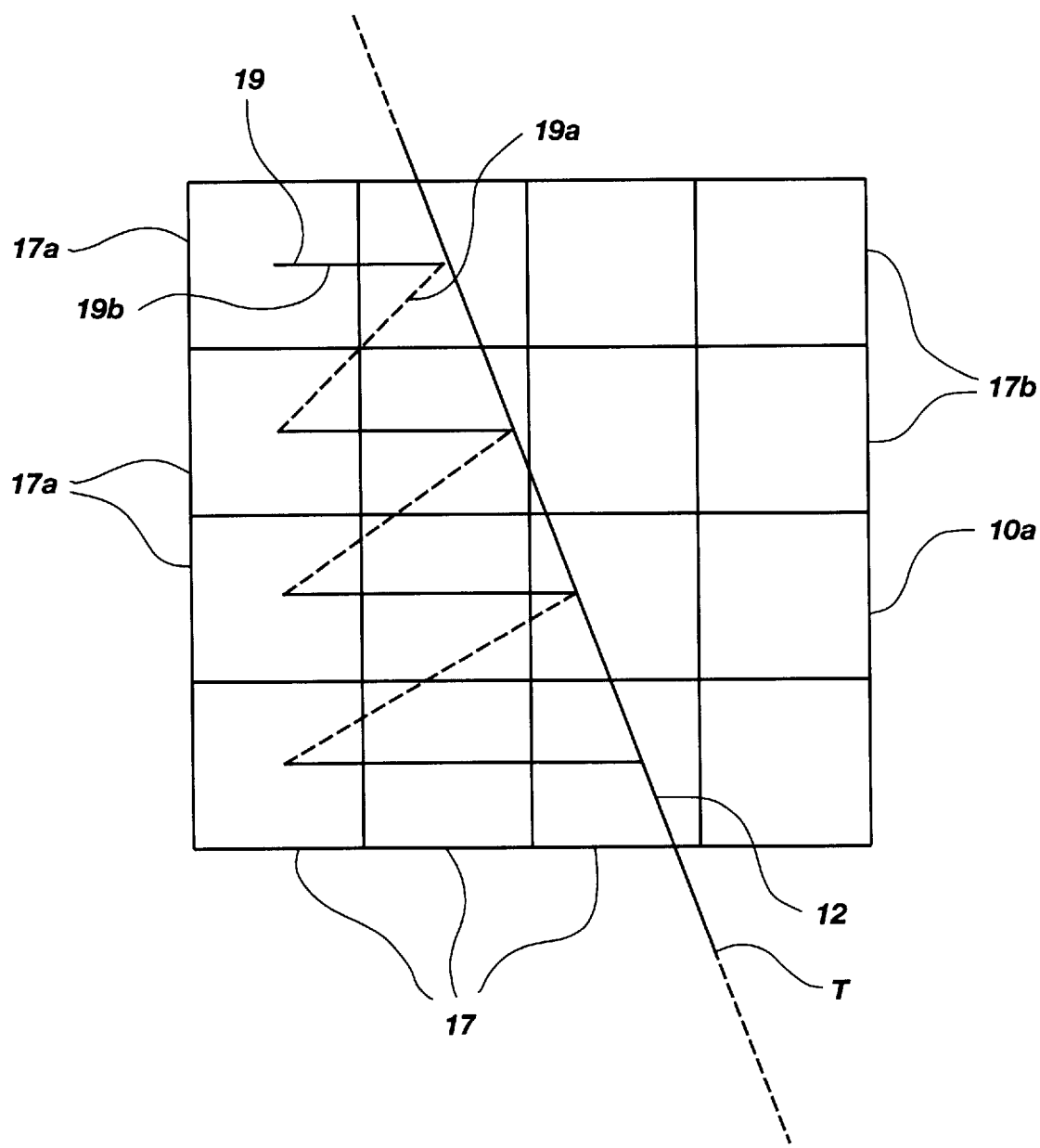
FIG. 1A is a diagram illustrating scan processing in accordance with the system of FIG. 1.

To consider a sequence of operation in greater detail, assume that the span preceding the span 10a has been completed and the span 10a is now to be treated as illustrated in FIG. 1A. That is, the overall operation has proceeded to now treat the span 10a as the next in sequence.

Of the sixteen pixels 17 within the span 10a, those lapped by the triangle T are selectively scan converted in a partial raster sequence as indicated by the line 19. Accordingly, the contribution of the triangle T to each lapped pixel 17 is determined. Specifically, the lapped pixels 17a (FIG. 1A, left of the triangle T edge 12) are scan converted in a partial raster pattern as indicated by the pixel scanline 19. Stated another way, those pixels 17b, completely to the right of the edge 12 (not affected by the triangle T), are not scan converted. Thus, in screen space, the multi-level system as disclosed, treats spans 10 in a partial raster sequence (FIG. 1), selectively scan converting the relevant pixels 17a in each span (FIG. 1A) to update the frame buffer FB (FIG. 1).

Figure 2:
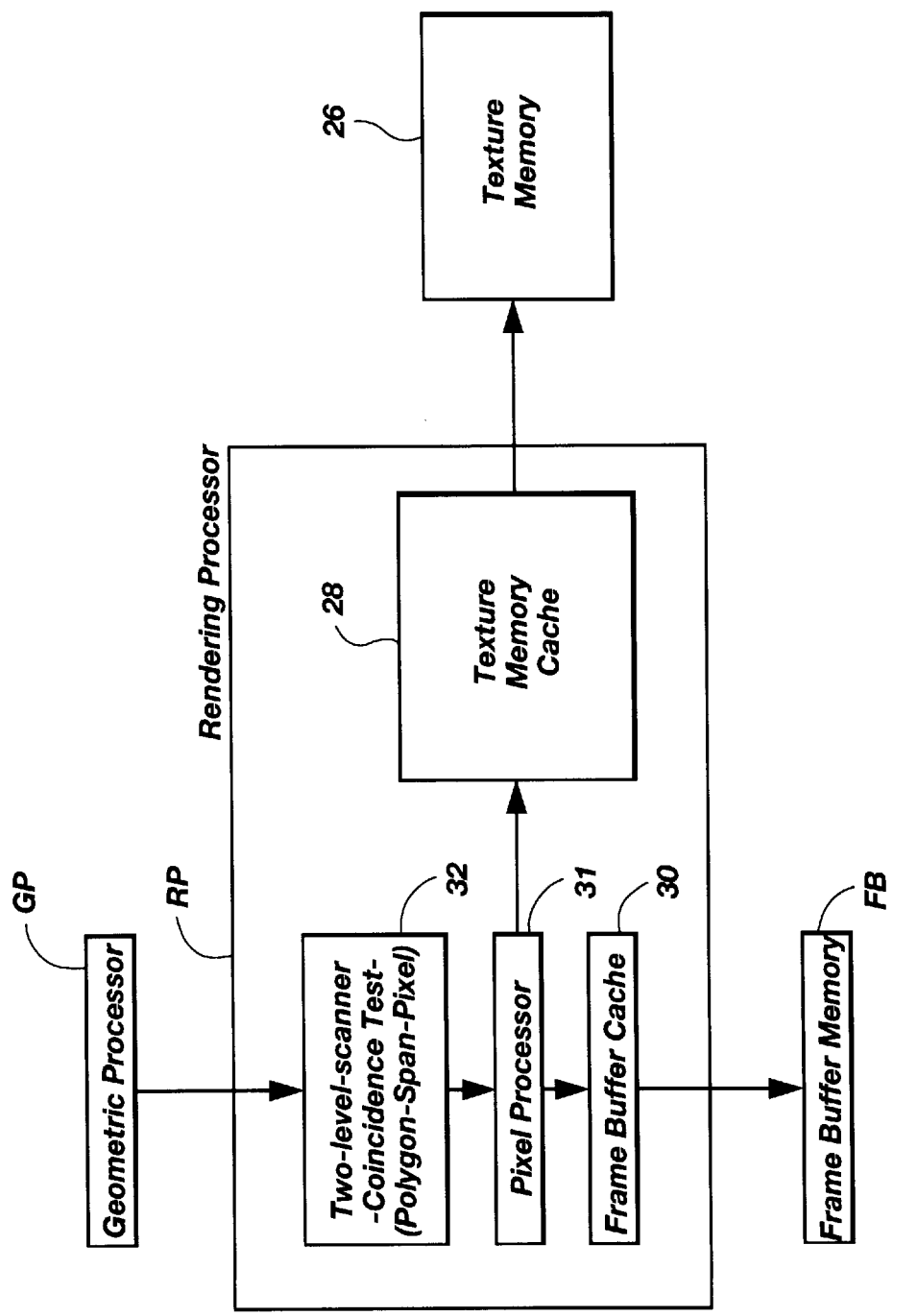
FIG. 2 is a more detailed block diagram of components in the system of FIG. 1.

Referring now to the structure of FIG. 2, the rendering processor RP is shown in somewhat greater detail along with an optional texture memory 26 operatively coupled to a texture memory cache 28, in the processor RP. Somewhat similarly, a frame buffer cache 30 functions from inside the processor RP in cooperation with the frame buffer memory FB as indicated.

Connectively associated with the caches 28 and 30, a multi-level (two) scanner 32 and a pixel processor 31 execute the scan processing. Essentially, the scanner 32 implements the multi-level scanning as described above by ordering the sequence of pixels (span-by-span). At the first level, coincidence is tested for spans and polygons. At the second level, the test is for the coincidence of polygon, span and pixel. As pixels are processed with regard to polygons, they are reflected in the frame buffer FB.

Generally, the memory of the disclosed embodiment (frame buffer FB and frame buffer cache 30) may take a form as disclosed in an article entitled "FBRAM: A New Form of Memory Optimized for 3D Graphics" published at Siggraph 94 by Deering, Schlapp and Lavelle and printed in the proceedings designated ACM-0-89791-667-0/94/007/0167, and hereby incorporated by reference. See also, a publication entitled "Rambus Architectural Overview" published by Rambus Inc. of Mountain View, Calif., Copyright 1992, 1993 (incorporated herein by reference).

Recapitulating, the rendering processor RP creates final image data by scan converting each primitive (triangle), selectively determining which primitives are visible at each pixel to account for visibility, then shading the pixel accordingly. As indicated above, problems of the past have involved providing sufficient processing power for the pixel calculations and memory bandwidth into the frame buffer FB to handle the pixel traffic.

As disclosed herein, and somewhat in accordance with convention, computations are performed only once for a polygon and polygons are grouped as a preliminary operation. A first step is a coincidence determination of the initial scanline intersecting the polygon (determined by the vertex with the smallest y value). As is somewhat typical, the apex of the triangle T (FIG. 1) intersects the scanline 14 at a single pixel. The two triangle edges 12 and 21 are involved. In accordance with convention, delta values then are calculated for x, z, R, G and B for each edge. See an article "A Parallel Algorithm for Polygon Rasterization" published in Computer Graphics, Volume 22, Number 4, August 1988 by Juan Pineda and designated ACM-0-89791-275-6/88/008/0017 (incorporated herein by reference).

As mentioned above, it has been proposed to group computations that are performed once for each scanline. Note that, sometimes a continuous sequence of pixels on a horizontal scanline has been called a "span." That is, the active portion of a scanline (horizontal pixels influenced by a polygon) has been called a "span." However, as the term is used herein, a "span" or "span area" identifies a plurality of adjacent pixels, e.g. a square or a rectangle. Again, if a span is only partly covered by the polygon, only those coincident pixels lapped by the polygon (influenced by) are generated.

After scanning the pixels within a span, the processor proceeds to another span. The distinction of the rendering processor RP resides in the multi-level scanning of areas to provide sequences of pixels for processing by the pixel processor 31. Other aspects as discussed below include texture mapping, generating pixels with multiple rendering processors and doing texture mapping with multiple rendering processors. Note that the operation of cache memories as the units 28 and 30 is well known as mentioned in the above-referenced Foley text at page 885.

Figure 3:
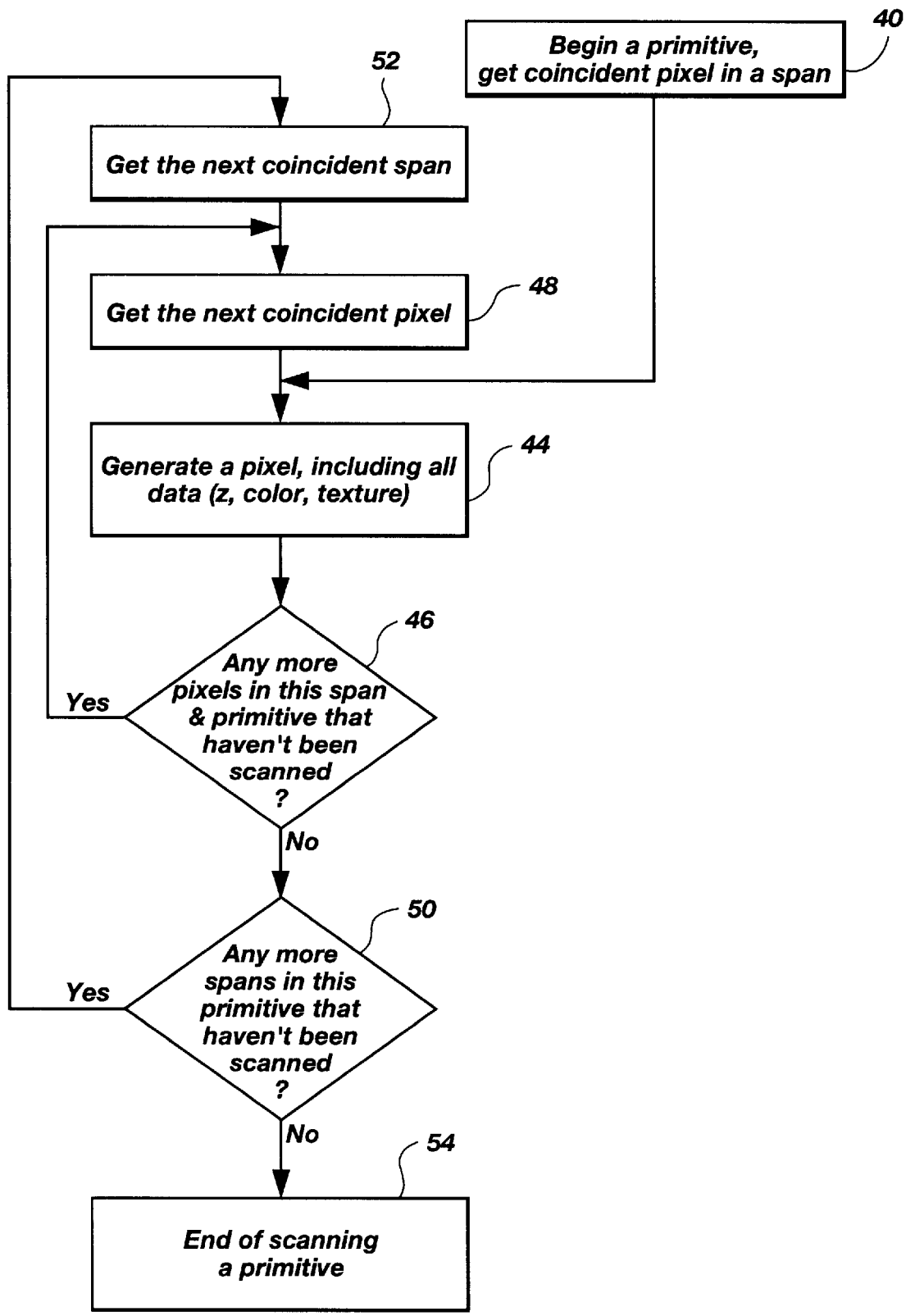
FIG. 3 is a flow diagram detailing the process performed in the system of FIG. 2.

To consider the operation of the rendering processor RP in greater detail, at the outset of processing the triangle T (FIG. 1) or any primitive, the two-level scanner 32 (FIG. 2) locates the initial pixel in the triangle T that also lies in an initial span. The process step is represented by a block 40 (FIG. 3, upper right). That is, the scanner 32 performs a multi-level test in raster sequence for the coincidence of triangle space, span space and pixel space.

With the location of the initial span (FIG. 1, apex of the triangle T) the initial pixel in the triangle T and the span 42 is generated as represented by a block 44 (FIG. 3). That is, after being identified by the scanner 32 (FIG. 2), the initial pixel is generated by the pixel processor 31 including all data, e.g. z-depth, color and texture.

With the completion of the data for each pixel in sequence, the scanner 32 proceeds to a query operation as represented in FIG. 3 by a block 46. Specifically, the query is for other pixels in the span and the triangle (primitive) that have not been scan converted. If another such pixel exists (yes), the process proceeds to identify the coincident pixel as represented by a block 48, then processing the pixel as described above and represented by the block 44.

From the query block 46, if no more coincident pixels exist in a span, the process moves to another query block 50. The query involves a test for the existence of additional spans in the primitive. If such additional spans exist, the polygon-coincident pixels in the span are located and processed as indicated by the blocks 48 and 44. However, if from the query of block 50, no more coincident spans exist in the current primitive, the primitive is finished as indicated by a block 54. Thus, for each polygon, pixel by pixel, scan by scan, the multi-level operation is accomplished to scan convert pixels. The operation involves selecting polygon coincident spans at a first level and polygon coincident pixels at a second level.

Figure 9:
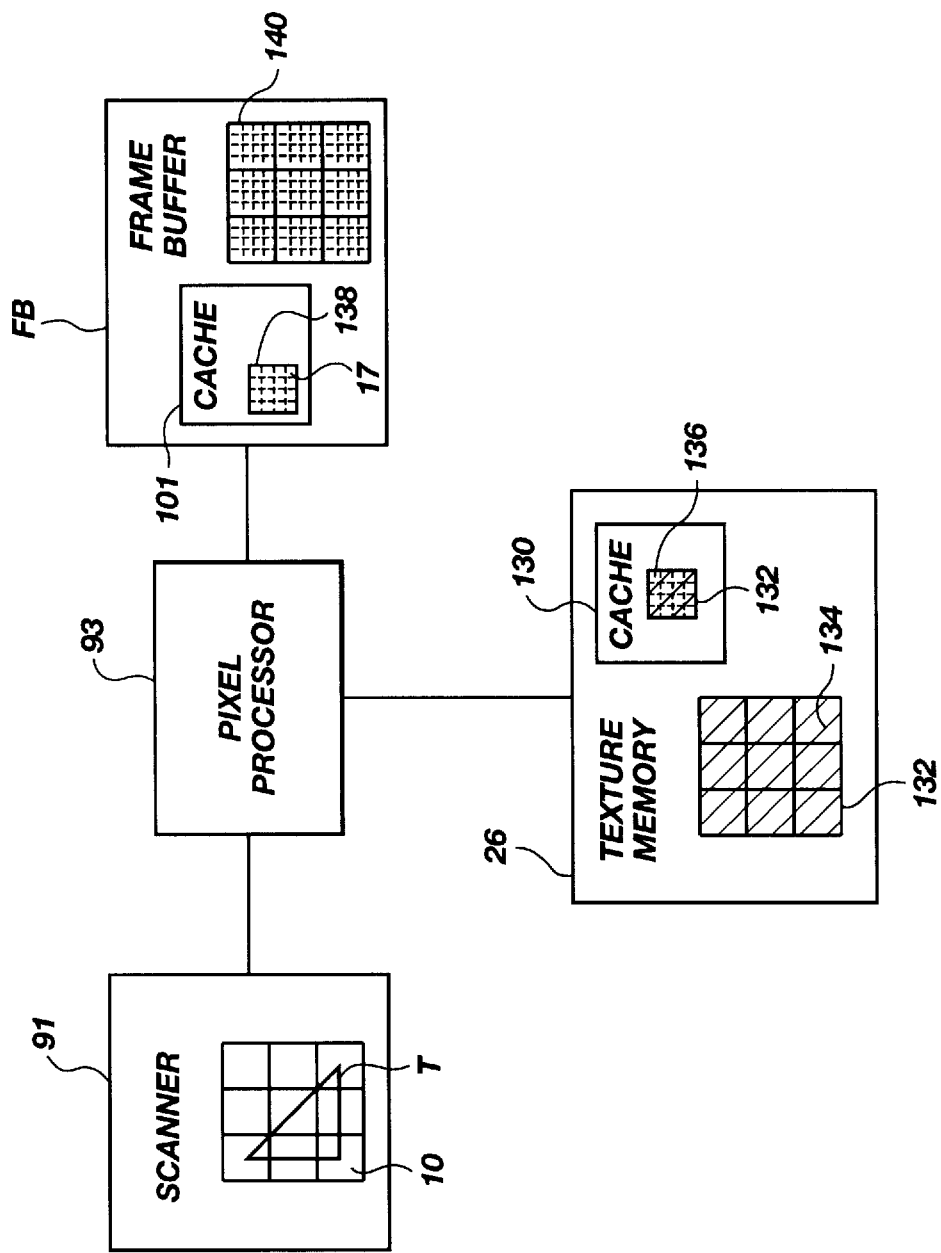
FIG. 9 is a block diagram illustrating data transfer in a system constructed in accordance with the present invention.
Figure 10:
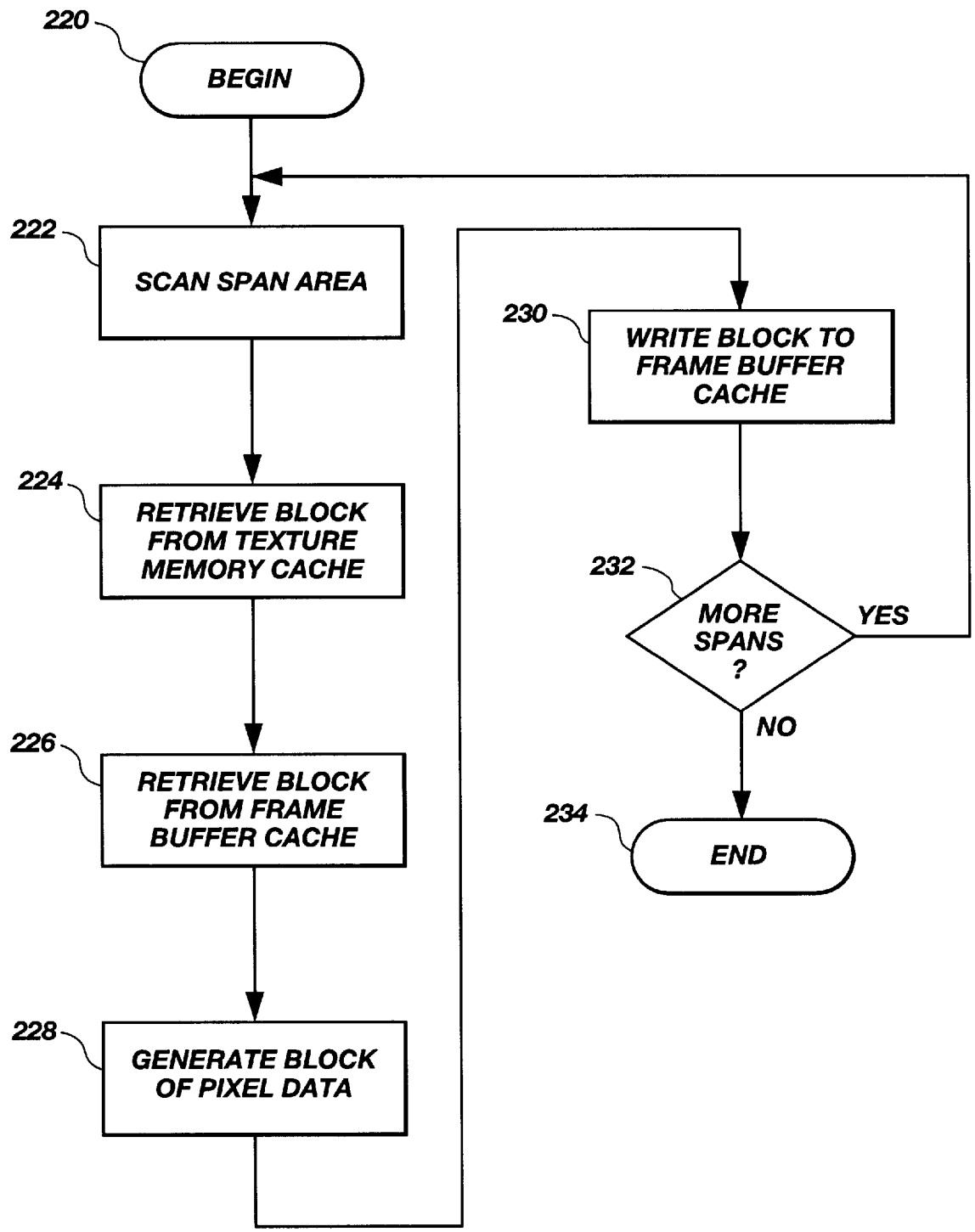
FIG. 10 is a flow diagram detailing a first process performed in the system of FIG. 9.

As discussed above, the pixel processor 93 processes the pixel data one span at a time to provide data that coincides with the organization of the frame buffer or the texture memory. As set forth in FIG. 10 beginning at a block 220 (top), the scanner 91 (FIG. 9) identifies each coincident span 10 for a triangle T (block 222). The pixel processor 93 retrieves a block 132 of texture data from a texture cache 130 (block 224). The texture block 132 contains the texture information 134 that is mapped to a span 10. In other words, the block 132 contains the texels 136 that are mapped to the pixels (e.g., pixel 17) in the span 10 currently being processed.

At a block 226, the pixel processor 93 retrieves a block 138 of data from the frame buffer cache 101. The retrieved block 138 corresponds to the span 10 being processed. This data (e.g., data 140) was previously stored in the frame buffer FB during a prior frame buffer update. The pixel processor generates the pixel data for the next frame (block 228) and writes the resultant block of pixel data to the frame buffer cache (block 230). At a block 232, the process repeats for the next span or terminates at a block 234. Accordingly, data is transferred a span at a time between the pixel processor and the texture memory 26 and frame buffer FB.

Figure 11:
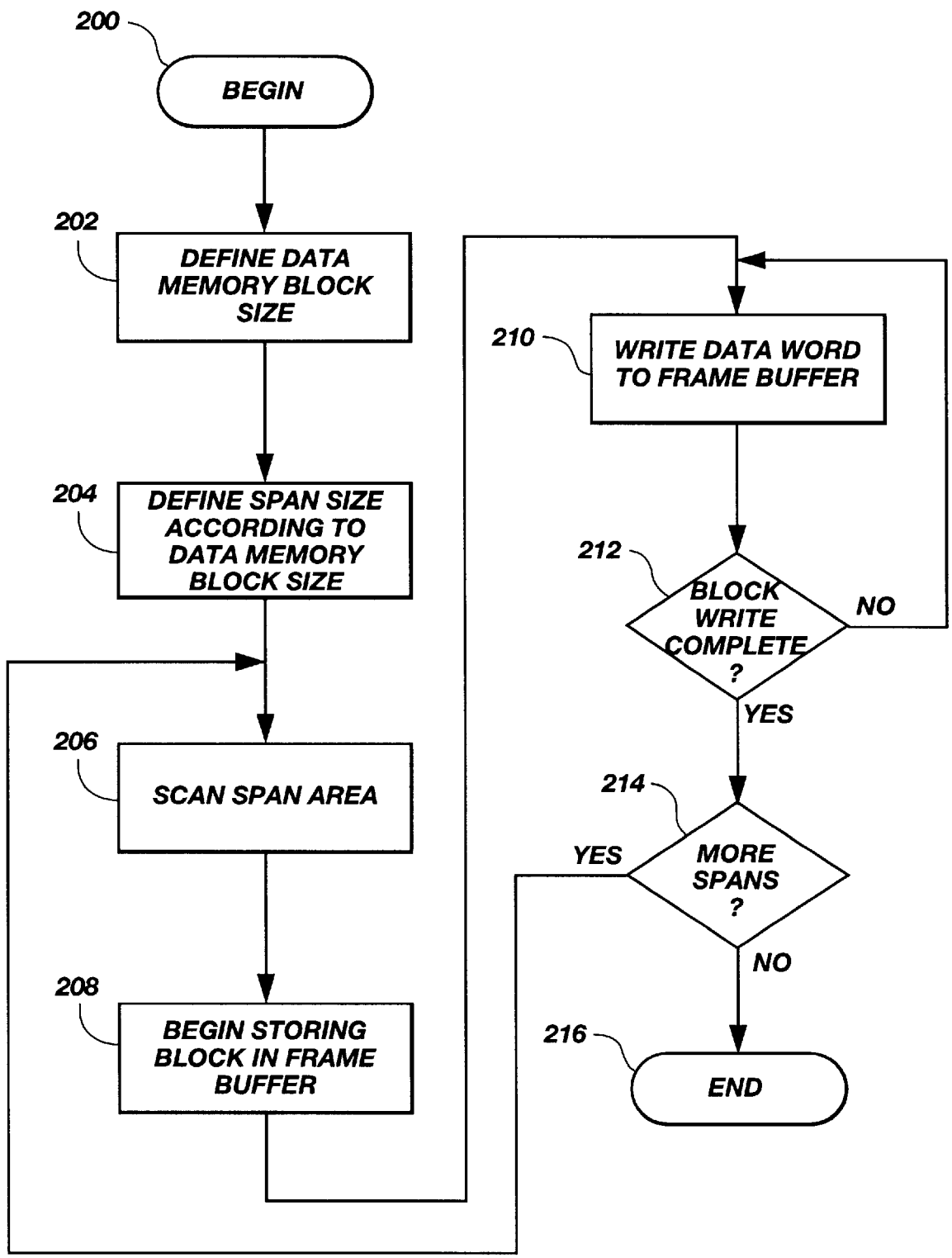
FIG. 11 is a flow diagram detailing a second process performed in the system of FIG. 9.

The efficiency of the data transfer process is improved by defining the size of a span according to the configuration of the data interface (e.g., the size and data organization of the corresponding cache) for the memory (e.g., frame buffer or texture memory). Referring to FIG. 11 beginning at a block 200, the data block size for the memory is specified to provide efficient data transfer to and from the data memory (block 202). This size may be selected based on the configuration of a cache used with or incorporated into the memory. The span size is selected according to the data memory block size (block 204).

Beginning at a block 206, the primitive is processed span-by-span. The primitive is scanned as discussed above. As each span of pixel data is generated, it is stored in the frame buffer (blocks 208 and 210). If multiple writes are needed to store the block of pixel data in the frame buffer, the process writes each data word from the block to the frame buffer, as necessary (block 212). At a block 214, the process repeats for the next span or terminates at a block 216. Accordingly, data is efficiently transferred a span at a time from the pixel processor to the frame buffer FB. Similar operations are used to read data from the frame buffer or a texture memory.

Figure 4:
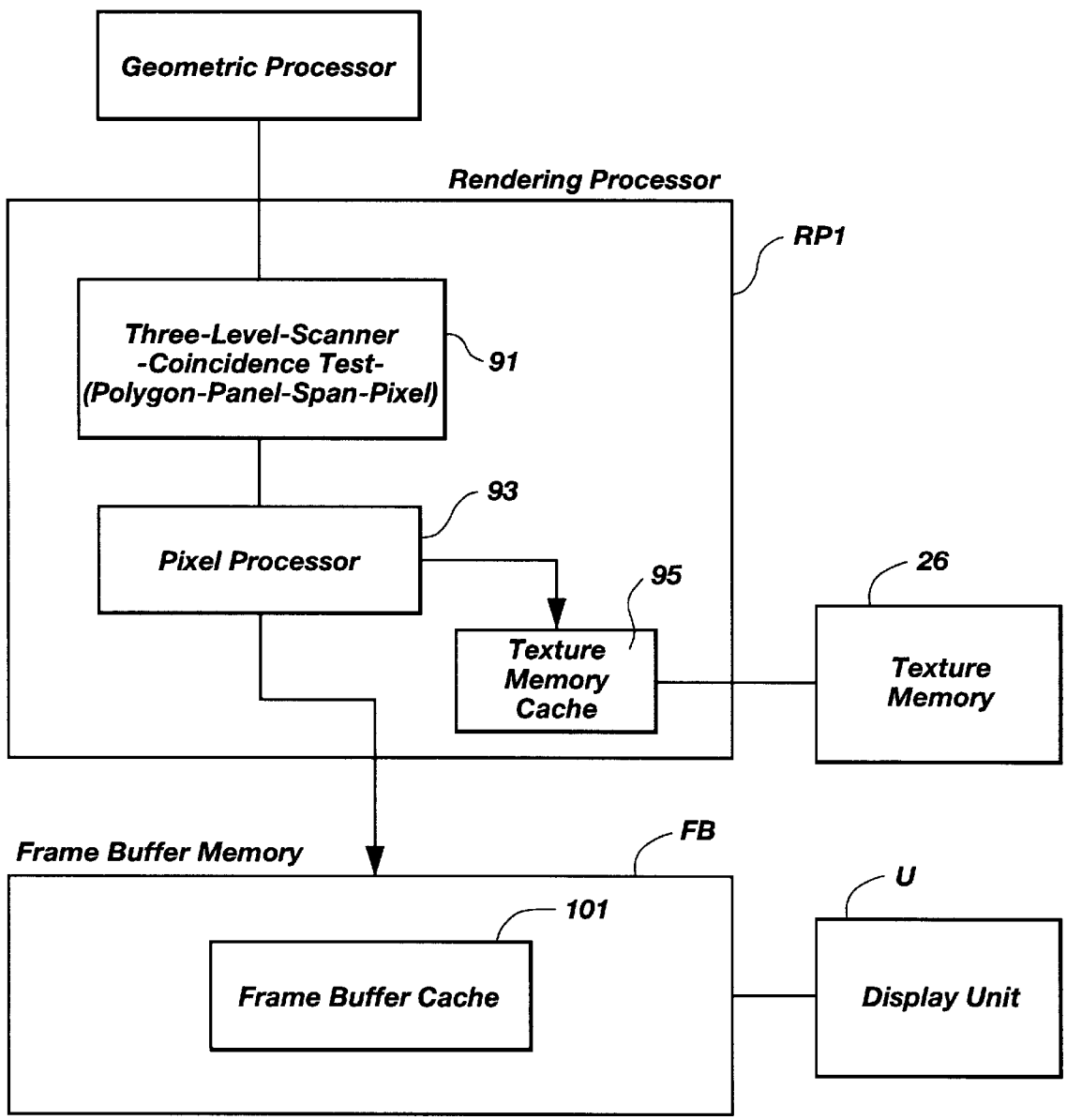
FIG. 4 is a more detailed block diagram of alternative components of the system of FIG. 1.

As explained above, multi-level scanning in accordance herewith is not restricted to two levels. In that regard, a three-level scanning system is illustrated in FIG. 4. A rendering processor RP1 has a three-level scanner 91 coupled to a pixel processor 93 and a texture memory cache 95. As previously explained, the texture memory cache 95 operates with a texture memory 26. The pixel processor 93 is functionally coupled to a frame buffer memory FB for driving a display unit U. The frame buffer memory FB incorporates a frame buffer cache 101 as disclosed in the above-referenced "FBRAM" article. The operation of the embodiment is illustrated by FIGS. 5 and 6 as will now be considered.

Figure 5:
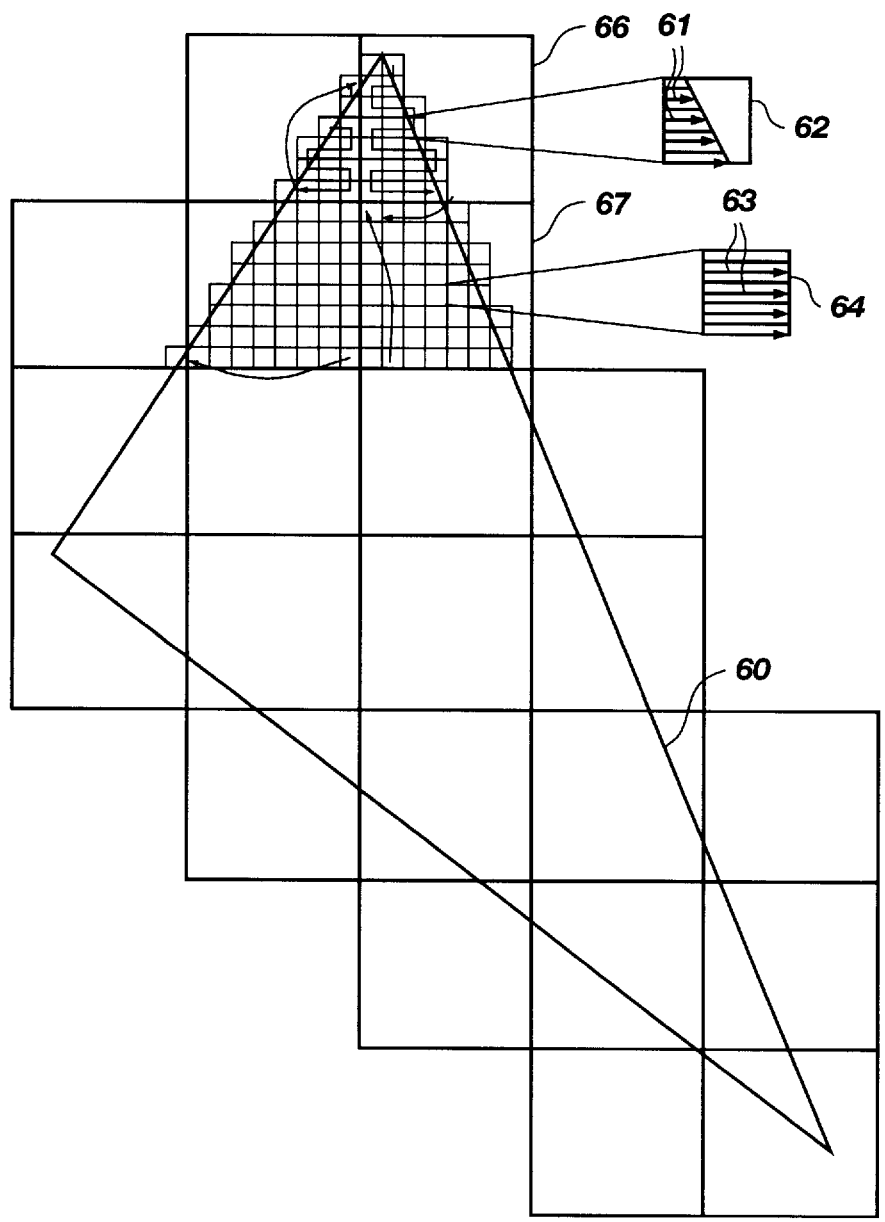
FIG. 5 is a diagrammatic representation illustrating one operating format for the system of FIG. 4.
Figure 6:
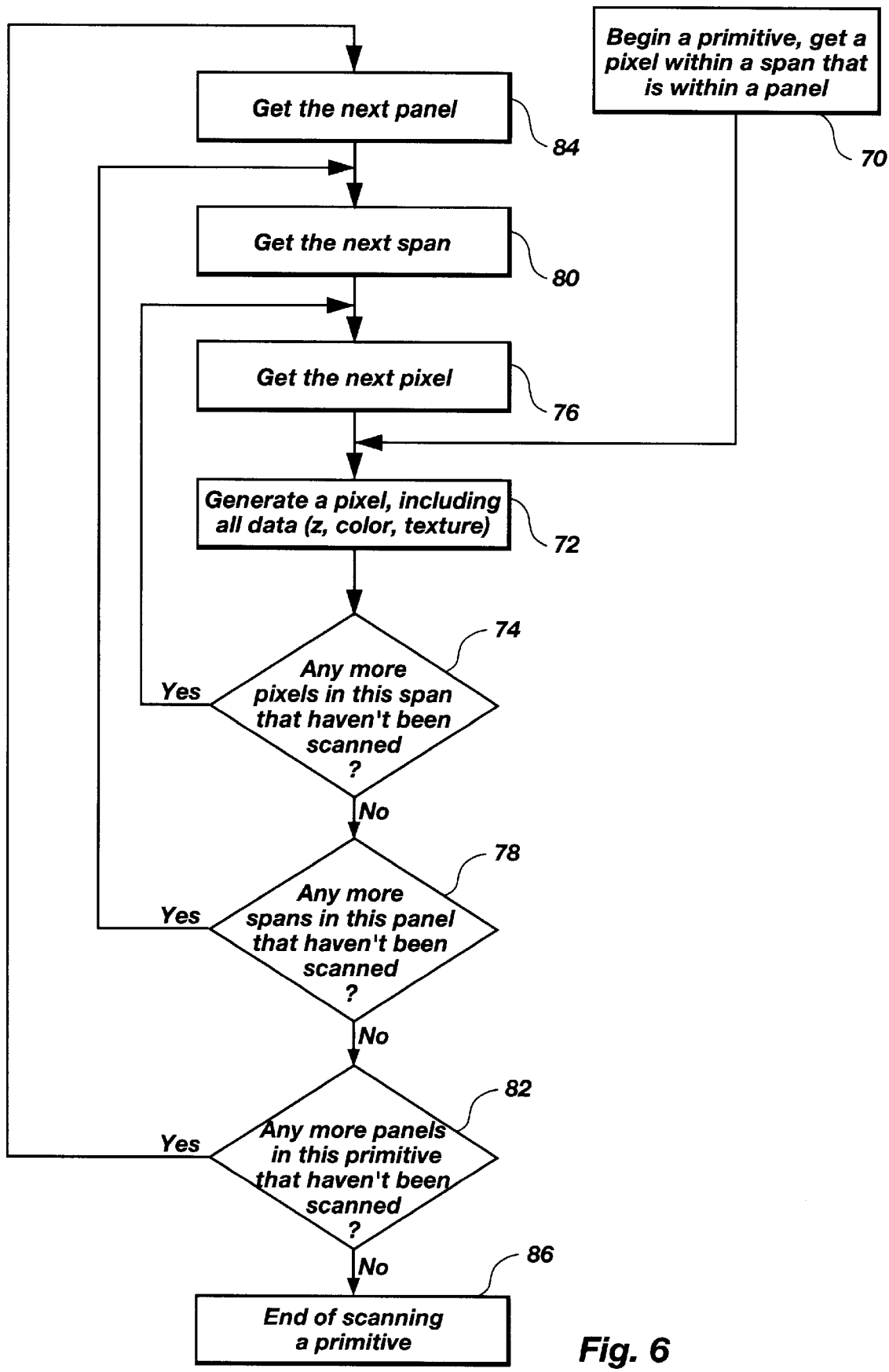
FIG. 6 is a flow diagram illustrating an alternative operating process for the system of FIG. 4.

FIG. 5 shows a triangle 60 with a fragment being scanned in three levels. The lowest level of scanning is individual pixels within each span area, e.g. as represented by lines 61 and 63 (alternate arrows) in spans 62 and 64, respectively. Note that the span areas 62 and 64 are square and each encompass sixty four pixels (eight-by-eight). Again, rectangular span areas could be employed of differing numbers of pixels, e.g. two-by-two, two-by-four and so on.

The intermediate level of scanning is of the spans within a panel area, e.g. panel areas 66 or 67. As illustrated, panel areas are square, defined by arrays of sixty four spans (eight-by-eight). Again rectangular areas may be utilized incorporating differing numbers of spans, e.g. sixteen-by-sixteen or sixteen-by-eight. In operation, all pixels lapping or coincident with a panel, a span and the triangle 60 are located and processed. The operation will now be treated in detail with reference to FIG. 6.

To initiate the operation with respect to a primitive in the form of a polygon, specifically the triangle 60, somewhat as explained above, the initial pixel is located within the first span that is within a panel. The step is indicated by the block 70 (FIG. 6, upper right). For the located pixel, data is generated including values of z, color and texture as indicated by the process step block 72.

With the pixel data generated, the process proceeds to a query step as indicated by a block 74. Specifically, the query is whether or not further lapped pixels exist in the span to be scan processed. An affirmative response returns the process to a block 76 for the step of obtaining data for the next pixel appropriate for processing. Thereafter, the process returns to the generation step as represented by the block 72.

From the query block 74, if no further lapped pixels exist in the span for processing, the process proceeds to another query step as represented by a block 78. Specifically, the query step involves the existence of more lapped spans (lapped by the polygon) in the current panel that have not been scan processed. If such spans exist, the process moves to a block 80 indicating the step of obtaining data on the next span. From that span, the next lapped or coincident pixel is obtained as indicated by the block 76 and the operation proceeds at the pixel level.

Proceeding from the query block 78, a negative determination advances the process to another query step as indicated by a block 82. The query block 82 involves the existence of more panels in the polygon that have not been scan processed. Somewhat similarly to the return steps as indicated above, if another coincident panel exists, the process regresses to a block 84 representing a step of obtaining data for the next polygon-coincident panel. Thereafter, the next coincident span is obtained and thereafter the next coincident pixel is obtained as indicated by the blocks 80 and 76, respectively.

A negative response from the query step represented by the block 82 indicates the completion of the current polygon as indicated by a block 86. Thus, three-level scanning of the polygon is accomplished by the three-level scanner 91 (FIG. 4). Essentially, polygons are so processed until the display image is defined.

Figure 7:
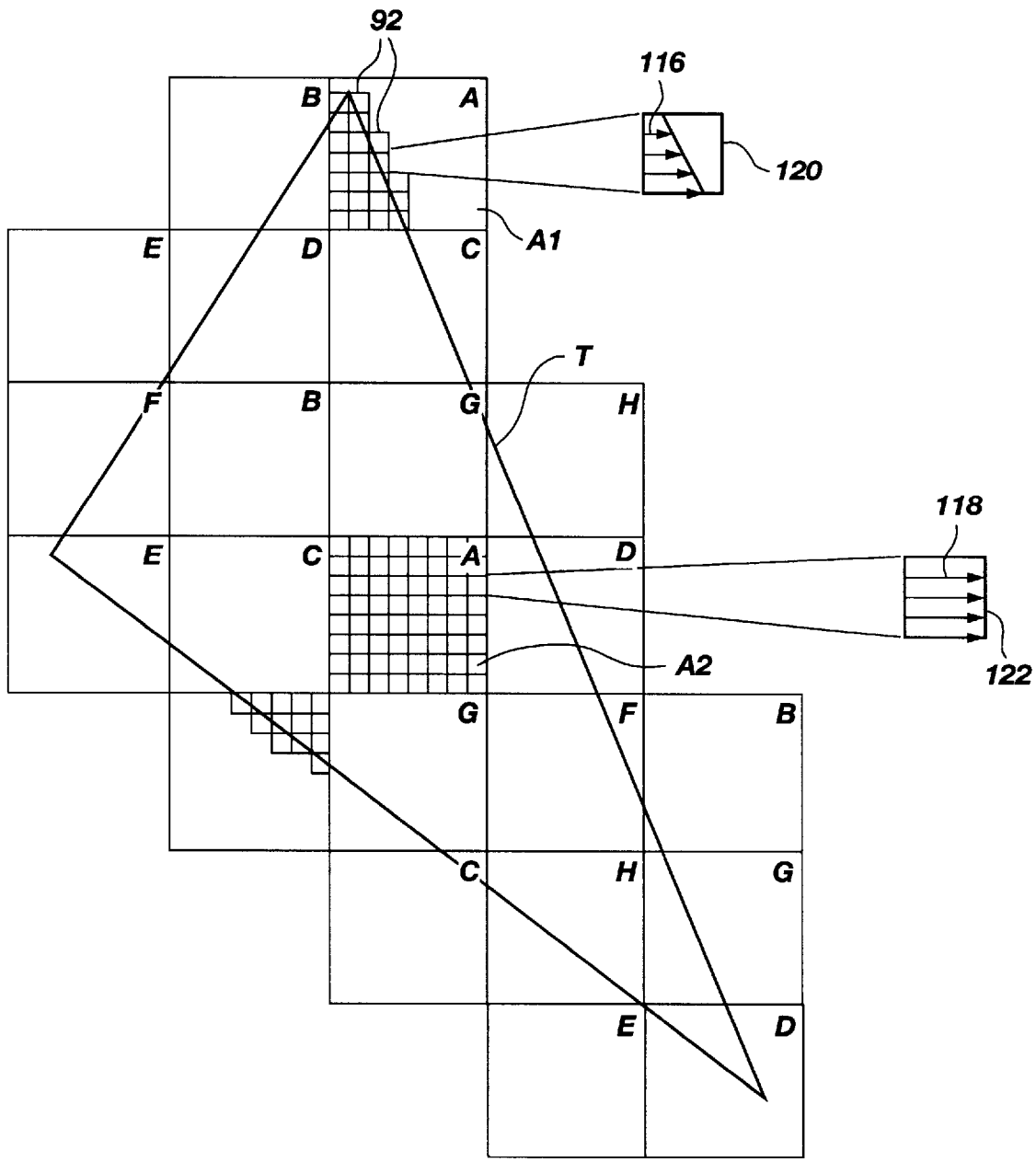
FIG. 7 is a diagrammatic representation illustrating another alternative form of operation for the system of FIG. 4.
Figure 8:
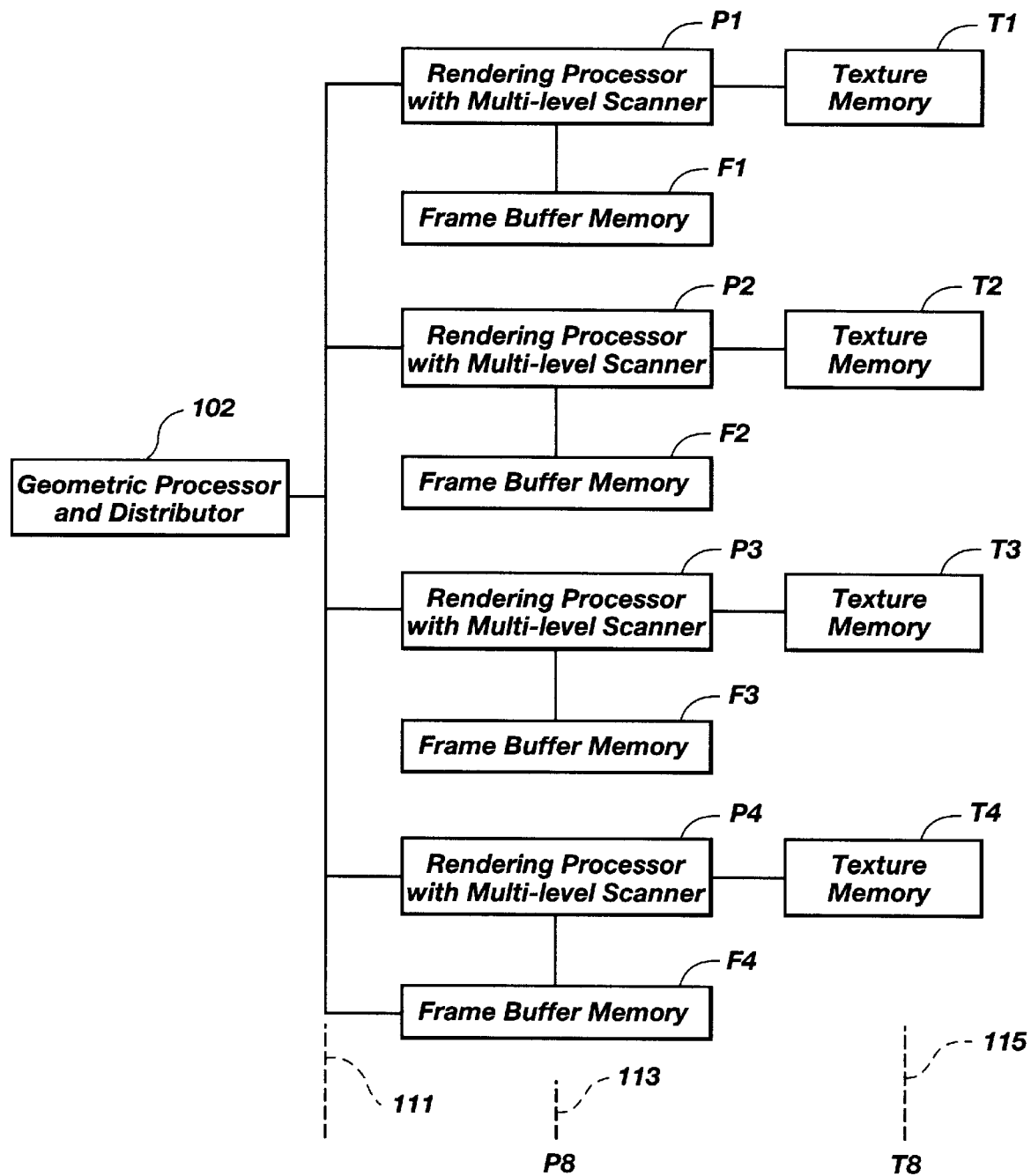
FIG. 8 is a block diagram illustrating the alternative form for the system operating as illustrated by FIG. 7.

Generally, three-level scanning has been determined to be particularly useful when a higher level performance is desired as a result of using multiple rendering processors that operate in parallel. In that regard, FIG. 7 shows a polygon, specifically triangle T with scan pattern fragments to illustrate three-level scan processing with eight pixel processors allocated as indicated by the letters A through H. That is, each of a plurality of processors P1–P8 (FIG. 8) is respectfully assigned one of the panel groups A through H to scan convert. Specifically, the allocations are:

Processor P1-Panels A
Processor P2-Panels B
Processor P3-Panels C
Processor P4-Panels D
Processor P5-Panels E
Processor P6-Panels F
Processor P7-Panels G
Processor P8-Panels H Note that for simplification, of the sets of eight units indicated, only four processors P1–P4 (with frame buffers F1–F4 and texture memories T1–T4) are shown in FIG. 8, the pattern of associated components continuing to a total of eight as indicated by the dashed-line arrows 111, 113 and 115.

Operationally, within each panel A–H, an assigned processor generates relevant pixels for all polygon coincident or lapped scans within the relevant panel. For example, within the panel A, the processor P1 generates pixels (arrows 116 and 118) for all coincident spans (e.g. spans 120 and 122) within the polygon-lapped panels A.

After completing a panel, each processor begins generating pixels in another span in another panel in accordance with the letter designations A–H as illustrated in FIG. 7.

To consider a further example, the rendering processor P1 computes the coincident pixels for the panels designated A1, A2, and so on. Concurrently, the other seven rendering processors P2–P8 simultaneously compute the relevant pixels for their associated panels B-H respectively. While the three-level scanning process may involve any of a number of parallel processors consider the eight-processor system of FIG. 8 in greater detail.

A geometric processor and distributor 102 (FIG. 8, left) supplies data for the panels A–H to the processors P1–P8 respectively, each incorporating a multi-level scanner as described above. Each of the rendering processors P1 through P8 operates with a fragment of a composite frame buffer memory, specifically buffer fragments F1–F8 respectively. Somewhat similarly, texture memories T1–T8 are associatively coupled respectively to the processors P1–P8.

In operation, the rendering processors P1–P8 function independently along with the texture memories T1–T8 to accomplish updated pixels in the frame buffer fragments F1–F8. The sequencing involves multi-level operation as specifically described by the diagram of FIG. 7, i.e. utilizing three-level scan processing. Accordingly, effective pixel rendering is accomplished with substantial improvement in overcoming the difficulties presented by the rasterization operation.

In view of the above explanations of exemplary systems, it will be appreciated that other embodiments of the present invention may be employed in many applications to accomplish rasterization in specific architectural configurations. While certain exemplary operations have been explained herein and certain detailed structures have been disclosed, the appropriate scope hereof is deemed to be in accordance with the claims as set forth below.

What is claimed is:

1. A computer graphics process for scan processing object primitives to generate rectangular blocks of pixel data, the blocks being sequentially stored in a frame buffer adapted to receive rectangular blocks of data, the pixel data being associated with display pixels having an associative space relationship with a display image space, said process including the steps of:

defining object primitives in relation to a plurality of span areas, each span area including a plurality of contiguous pixel areas of said display image space;

scanning said span areas to locate lapped spans, with lapped pixels within a primitive;

scanning pixels within said lapped spans to locate lapped pixels for processing;

processing said lapped pixels within each span, pixel-by-pixel, to generate rectangular blocks of pixel data associated with arrays of said display pixels; and sequentially storing said blocks of pixel data in a frame buffer, said frame buffer including an interface adapted to receive and transmit rectangular blocks of data.

2. A computer graphics process according to claim 1 further including the step of defining a size of said span areas according to a size defined for said blocks of data received and transmitted by said interface.

3. A computer graphics process according to claim 1 wherein said storing step further includes the step of storing said blocks of pixel data in a cache adapted to receive and transmit rectangular blocks of data.

4. A computer graphics process according to claim 3 further including the step of defining a size of said span areas according to a size defined for said blocks of data received and transmitted by said cache.

5. A computer graphics process according to claim 1 further including the steps of:

retrieving a block of texture data from a texture memory, said texture memory including an interface adapted to receive and transmit rectangular blocks of data; and processing said block of texture data to provide texture for a span of said pixels.

6. A computer graphics process according to claim 5 wherein said retrieving step further includes the step of retrieving said blocks of texture data from a cache adapted to receive and transmit rectangular blocks of data.

7. A computer graphics process according to claim 1 wherein said step of processing said lapped pixels within each span further includes the steps of:

retrieving blocks of prior pixel data from said frame buffer;

processing said blocks of prior pixel data from said frame buffer to provide said blocks of pixel data.

8. A computer graphics process according to claim 1 wherein said step of scanning pixels includes the step of scanning said pixels in a raster sequence.

9. A computer graphics system for scan processing object primitives to generate rectangular blocks of pixel data, the blocks being sequentially stored in a frame buffer adapted to receive rectangular blocks of data, the pixel data being associated with display pixels having an associative space relationship with a display image space of a display unit, said system comprising:

a frame buffer organized to have an associative space relationship with the image space of said display unit;

means defining said frame buffer into a plurality of span areas, each span area including a plurality of pixel areas;

a scanner for scanning said span areas to locate lapped pixels within a primitive and a span and for scanning said lapped pixels to locate pixels for processing; and a processor for processing said lapped pixels within each span, pixel-by-pixel, to sequentially generate rectangular blocks of pixel data associated with arrays of said display pixels; and a frame buffer including an interface adapted to receive and transmit rectangular blocks of data, said frame buffer connected to receive said blocks of pixel data.

10. A computer graphics system according to claim 9 wherein a size for said span areas is defined according to a size defined for said blocks of data received and transmitted by said interface.

11. A computer graphics system according to claim 9 further including a frame buffer cache for storing said blocks of pixel data, said cache being adapted to receive and transmit rectangular blocks of data.

12. A computer graphics system according to claim 11 wherein a size for said span areas is defined according to a size defined for said blocks of data received and transmitted by said cache.

13. A computer graphics system according to claim 9 further including a texture memory, said texture memory including an interface adapted to receive and transmit rectangular blocks of data, wherein said processor processes a block of texture data retrieved from said texture memory to provide texture for a span of said pixels.

14. A computer graphics system according to claim 13 further including a texture memory cache adapted to receive and transmit rectangular blocks of data, wherein said processor retrieves said block of texture data from said cache.

15. A computer graphics system according to claim 9 wherein said processor processes blocks of prior pixel data retrieved from said frame buffer to provide said blocks of pixel data.

16. A computer graphics system according to claim 9 wherein said scanner processes said pixels in a raster sequence.

17. A computer graphics process for scan processing object primitives to generate display pixels, as in a frame buffer, the pixels being organized in screen space having an associative space relationship with a display image space, said process including the steps of:

defining object primitives in relation to a plurality of span areas, each span area including a plurality of contiguous pixel areas of said display image space;

scanning said span areas to locate lapped spans, with lapped pixels within a primitive;

scanning, in a raster sequence, pixels within said lapped spans to locate lapped pixels for processing; and processing said lapped pixels as scanned, pixel-by-pixel, span-by-span to provide pixel data in said frame buffer.

18. A computer graphics process according to claim 17 wherein said span areas are scanned in a predetermined sequence.

19. A computer graphics process according to claim 17 wherein said scanning and processing steps are executed as parallel operations to process pixels from multiple scan areas concurrently.

20. A computer graphics process according to claim 17 further including the steps of:

defining object primitives in relation to a plurality of panels, each panel including a plurality of span areas; and scanning said panels to locate span areas.

* * * * *